United States Patent Office 3,525,784
Patented Aug. 25, 1970

3,525,784
METHOD OF PREPARING IRON ORE PELLETS
Joachim Endell, Bottrop, Germany, assignor to Firma Huttenwerk Oberhausen AG., Oberhausen, Rhineland, Germany, a corporation of Germany
No Drawing. Filed Aug. 15, 1968, Ser. No. 752,760
Claims priority, application Germany, Aug. 17, 1967, 1,583,175
Int. Cl. C21b 1/10, 1/24, 1/28
U.S. Cl. 264—63                                    4 Claims

ABSTRACT OF THE DISCLOSURE

A method of producing iron-ore pellets wherein particles or iron ore are milled together with a binder in the form of clay (i.e. clay slate, clay schist, shale clay or flint clay) containing 10 to 20% by weight residual coal and obtained from the washing of coal and subjected to pelletizing in a drum or pan pelletizer and prefired at a temperature below 850° C. (preferably 750 to 800° C.) and then are sintered at a temperature of 1200 to 1250° C. prior to being introduced into a shaft-type furnace for direct gas reduction of the pellets.

SPECIFICATION

My present invention relates to improvements in methods of making ore pellets adapted to be subjected to reduction in shaft-type furnaces.

It has been a common practice in recent times to produce metallic iron (e.g. sponge iron) by the direct reduction of iron ore in shaft-type reducing furnaces in which iron ore bodies are passed countercurrent to a reducing-gas stream. The iron-ore bodies are generally pellets produced by so-called pelletizing drums or rotating trays by agglomerating ground or milled iron or with moisture to produce "green" pellets or briquettes which are thereafter fired, burned or sintered to increase the rigidity of the pellets. The moisture contact, which is supplied to the ore concentrate or finely divided iron ore is usually just sufficient to effect agglomeration or globulization of the particles. It has already been proposed to add various binders to the agglomerate and bentonite has been found to be effective.

In many cases, however, it has been found that the resulting pellets have a tendency to dry prematurely, i.e. prior to firing or in the course of firing, thereby loosing a considerable amount of their compressive strength and giving rise to fragmentation or deterioration of the pellets. Subsequent sintering does not appear to compensate for this loss of compressive strength. Furthermore, the problem increases in importance as additional proportions of water are used as is necessary with increasing fineness of the ore concentrate or ground iron ore. Attempts have been made to solve this problem by the addition of inorganic salts such as chlorides and iron sulfate and by the addition of lime or calcium hydroxide in proportions of between 0.5 and 2% by weight. These binders have been found to be effective at temperatures between 100° C. and the sintering temperature to maintain to a certain extent the compressive strength of the pellets or briquettes. However, such binders are expensive and care must be taken to employ high-grade compounds. The bentonite proposed in connection with pellet binders is an earth product of such high quality and is, accordingly, relatively expensive.

It has also been suggested to improve the homogeneity of the metallurgical process and the quality of the pellets by adding thereto finely divided carbon, e.g. ground coal. This, too, has not been successful in many systems and has involved considerable increases in cost.

It is, therefore, an important object of the present invention to provide an improved method of pelletizing iron ore in the form of ground ore or the finely divided ore concentrates obtained by flotation or the like which will yield at substantially lower cost than heretofore, uniformly reacting pellets of high structural strength.

Another object of this invention is to provide a method of making pellets of the character described in which crumbling and pellet deterioration of the type characterizing earlier systems can be obviated.

These objects and others, which will become apparent hereinafter, are attained by the use, according to this invention, of up to 5% by weight of a novel binder in the pelletizing of iron ore in finely divided form, e.g. as concentrates of the type previously mentioned or ground iron ore in one concentrated form. The novel binder of my present invention is the finely divided shale (otherwise known as clay slate, clay schist, flint clay or spent shale) produced by the washing of coal, usually at the coal mine site, and containing between 10 and 20% by weight finely divided or particulate coal.

This binder, which is of low cost and is usually considered a waste product of coal-washing stations, often must be recovered from the wash water to prevent water pollution by the discharged wastes. It will be understood, however, that the finely divided shale may be used, without the aforementioned proportion of residual coal, but that the retention of the 10 to 20% by weight of the coal greatly improves the metallurgical characteristics of the pellet or briquette and its physical characteristics prior to reduction in a metallurgical furnace.

Substantially any proportion of the binder in the final pellet (i.e. from trace amounts of about 0.01% by weight) affords improved results with respect to the compressive strength of the iron-ore bodies although quantities in excess of 5% by weight are not found generally to be necessary.

According to a more specific feature of this invention, the iron ore and the slate particles obtained from the washing of coal are ground or milled together in a dry state to form a highly intimate mixture which can be pelletized by the addition of moisture in the usual manner and in conventional pelletizing drums or tilted rotatable trays. I have also found it to be advantageous to add earlier-known binders, especially limestone, burned lime and calcium hydroxide in amounts of 0.5 to 2% by weight to the intimate mixture at the milling thereof and prior to pelletizing. Advantageously, the milling of the coal-washing shale and the iron ore is carried out to a particle fineness of about 2000 cm.²/g. in the Blaine system. Furthermore, best results have been obtained with a coal-washing shale product containing carbon of the following composition:

|  | Weight percent |
|---|---|
| Iron | 3.8 ($\pm 1\%$) |
| Carbon | 14.0 ($\pm 2\%$) |
| Silica | 43.2 ($\pm 5\%$) |
| Alumina and titania jointly | 21.8 ($\pm 5\%$) |
| Calcium oxide | 1.6 ($\pm 0.5\%$) |
| Magnesia | 1.6 ($\pm 0.5\%$) |
| Potassium oxide ($K_2O$) | 3.3 ($\pm 1\%$) |
| Sodium oxide ($Na_2O$) | 0.4 ($\pm 0.2\%$) |
| Sulfur | 1.1 ($\pm 0.5\%$) |

This product should preferably be added to the iron ore in a proportion above 1% but in an amount less than 5% by weight.

Still another feature of this invention resides in a two-step pelletizing process wherein, after pelletizing the finely ground mixture of iron ore and coal-washing slate, the pellets are preburned or fired at a temperature below 850° C. and preferably in the range of 750 to 800° C. prior to being introduced into the sintering zone in which the pellets may be fired at the usual sintering temperatures of 1200 to 1250° C. Thus, by contrast with earlier systems using bentonite as a binder, the preferred proportion of coal-washing shale is greater while the preburning temperature is less. I have also found it to be desirable, when the coal-washing shale is obtained in a moist, wet or suspended condition from the washing of coal at the mine site to carry out the mixing and milling steps in a dryer mill in which milling of the mixture, drying of the shale product and mixing of the shale product with iron ore is carried out concurrently. Furthermore, it has been observed that additional moisture during the pelletizing step is not always necessary since the shale product renders the intimate mixture sufficiently plastic (moldable) to allow agglomeration when milled to the indicated fineness. The pellets have also been observed to increase the efficiency of the metallurgical process, in terms of the output of the shaft furnace, presumably because of the carbon content of the pellets which also reduces the fuel consumption. Moreover, tests have shown that the present system is particularly advantageous with pellets containing a relatively high proportion or iron ore (say 68 to 69% by weight iron) which are particularly susceptible to crumbling.

EXAMPLE

A wet coal-washing product containing finely divided shale and residual coal is recovered from a coal-washing station and admixed with finely divided ore in a drying mill until the milled product has a fineness of 2000 cm.$^2$/g. (Blaine), the proportion of coal-containing shale being about 3% by weight with a coal proportion of about 14%. The analysis of the shale showed the following composition:

| | Weight percent |
|---|---|
| Iron | 3.8 |
| Carbon | 14.0 |
| Silica | 43.2 |
| Alumina and titania jointly | 21.8 |
| Calcium oxide | 1.6 |
| Magnesia | 1.6 |
| Potassium oxide ($K_2O$) | 3.3 |
| Sodium oxide ($Na_2O$) | 0.4 |
| Sulfur | 1.1 |

The iron content of the mixture was 68 to 69%. Tests were made with and without the addition of 0.5, 1 and 2% each of limestone, burned lime and calcium hydroxide during the milling stage. The mixtures were converted to pellets by tumbling in drum-type and tray-type pelletizers and the green pellets subjected to a preburning at a temperature of 750 to 800° C. to drive out traces of residual moisture and yield a noncrumbling product. The preburning stage requires a period of the order of 5 to 20 minutes. Thereafter, sintering was carried out in the usual manner at 1200 to 1250° C. The resulting sintered pellets were subjected to reduction in a shaft furnace with a reducing gas consisting predominantly of carbon monoxide and hydrogen. Comparison tests were made with pellets in which bentonite replaced the coal-washing shale in all cases, the green and sintered pellets were found to have less tendency to crumble and greater compressive strength than the bentonite-containing pellets, a greater gas permeability than the bentonite-containing pellets, a reduced tendency toward abrasive deterioration than the bentonite-containing pellets and to allow a heat saving in both preheating and reduction steps. In each case as well an increase in the throughput of the reduction furnace and a lowering of the cost of the pelletizing step were manifest.

I claim:
1. A method of making iron-ore pellets comprising the steps of:
   (a) combining the iron ore with a comminuted shale product derived from the washing of coal and containing 10 to 20% by weight carbon in an amount up to 5% by weight of the mixture;
   (b) drying the mixture formed in step (a) and milling the mixture to a Blaine fineness of about 2000 cm.$^2$/g.;
   (c) forming the milled mixture of step (b) into pellets;
   (d) prefiring the pellets made in step (c) at a temperature below 850° C.; and
   (e) sintering the prefired pellets of step (d) at a temperature between 1200° C. and 1250° C.

2. The method defined in claim 1, further comprising the step of adding to said mixture a further binder selected from the group which consists of limestone, burned lime and calcium hydroxide.

3. The method defined in claim 2 wherein the prefiring of said pellets is carried out at a temperature of substantially 750 to 800° C.

4. The method defined in claim 3 wherein said shale product has substantially the following composition:

| | Weight percent |
|---|---|
| Iron | 3.8 (±1%) |
| Carbon | 14.0 (±2%) |
| Silica | 43.2 (±5%) |
| Alumina and titania jointly | 21.8 (±5%) |
| Calcium oxide | 1.6 (±0.5%) |
| Magnesia | 1.6 (±0.5%) |
| Potassium oxide ($K_2O$) | 3.3 (±1%) |
| Sodium oxide ($Na_2O$) | 0.4 (±0.2%) |
| Sulfur | 1.1 (±0.5%) |

References Cited

UNITED STATES PATENTS

| 2,075,210 | 3/1937 | Kugener | 75—5 |
| 2,805,141 | 9/1957 | Apuli | 75—5 |
| 3,258,327 | 6/1966 | Smoot | 75—5 |
| 3,264,092 | 8/1966 | Ban | 75—5 |
| 3,295,957 | 1/1967 | Robertson | 75—5 |
| 3,338,705 | 8/1967 | Meyer et al. | 75—5 |

FOREIGN PATENTS 994,588   6/1965   Great Britain.

JULIUS FROME, Primary Examiner

J. H. MILLER, Assistant Examiner

U.S. Cl. X.R.

23—313; 75—5; 264—56